(12) United States Patent
Syed et al.

(10) Patent No.: US 10,431,787 B2
(45) Date of Patent: Oct. 1, 2019

(54) BATTERY PACK RETENTION ASSEMBLY AND RETENTION METHOD

(71) Applicant: Ford Global Technologies, LLC, Dearborn, MI (US)

(72) Inventors: Shamsuddin A. Syed, Canton, MI (US); Saravanan Paramasivam, South Lyon, MI (US); Rajaram Subramanian, Ann Arbor, MI (US); David J. Pfeiffer, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 200 days.

(21) Appl. No.: 15/681,060

(22) Filed: Aug. 18, 2017

(65) Prior Publication Data

US 2019/0058172 A1    Feb. 21, 2019

(51) Int. Cl.
| | |
|---|---|
| *H01M 2/10* | (2006.01) |
| *H01M 10/6561* | (2014.01) |
| *H01M 10/655* | (2014.01) |
| *H01M 10/6556* | (2014.01) |
| *H01M 10/625* | (2014.01) |

(52) U.S. Cl.
CPC ....... *H01M 2/1077* (2013.01); *H01M 2/1083* (2013.01); *H01M 10/625* (2015.04); *H01M 10/655* (2015.04); *H01M 10/6556* (2015.04); *H01M 10/6561* (2015.04); *H01M 2220/20* (2013.01)

(58) Field of Classification Search
CPC .... H01M 2/1077; H01M 2/10; H01M 2/1061; H01M 2/1072; H01M 2/1083; H01M 2/1094; H01M 10/625; H01M 10/655; H01M 10/6556; H01M 10/6561; H01M 2220/20
See application file for complete search history.

(56) References Cited

U.S. PATENT DOCUMENTS

| | | | | |
|---|---|---|---|---|
| 8,225,969 | B2* | 7/2012 | Quinn | F16B 2/065 180/68.5 |
| 2012/0244404 | A1* | 9/2012 | Obasih | B60L 3/0046 429/99 |
| 2013/0095360 | A1 | 4/2013 | Niedzwiecki et al. | |
| 2015/0044535 | A1* | 2/2015 | Kobayashi | H01M 4/134 429/94 |
| 2017/0084890 | A1 | 3/2017 | Subramanian et al. | |

FOREIGN PATENT DOCUMENTS

| | | |
|---|---|---|
| EP | 2768045 | 8/2014 |
| JP | 07094160 | 4/1995 |

* cited by examiner

*Primary Examiner* — Gregg Cantelmo
(74) *Attorney, Agent, or Firm* — Carlson, Gaskey & Olds, P.C.

(57) ABSTRACT

A battery pack retention assembly includes, among other things, a conforming bracket that secures a battery array within a battery pack. The conforming bracket includes platforms that flexes as the conforming bracket is secured. The flexing facilitates aligning an area of the conforming bracket with a thermal exchange plate. A battery pack retention method includes, among other things, flexing a conforming bracket to reduce a gap between the battery array and a thermal exchange plate. The flexing occurs when securing a battery array to within a battery pack.

15 Claims, 5 Drawing Sheets

BATTERY PACK RETENTION ASSEMBLY AND RETENTION METHOD

TECHNICAL FIELD

This disclosure relates to a retention assembly of a battery pack and, more particularly, to utilizing a conforming bracket to secure portions of a battery array of the battery pack.

BACKGROUND

Generally, electrified vehicles differ from conventional motor vehicles because electrified vehicles are selectively driven using one or more battery-powered electric machines. Conventional motor vehicles, by contrast, rely exclusively on an internal combustion engine to drive the vehicle. Electrified vehicles may use electric machines instead of, or in addition to, the internal combustion engine.

Example electrified vehicles include hybrid electric vehicles (HEVs), plug-in hybrid electric vehicles (PHEVs), fuel cell vehicles, and battery electric vehicles (BEVs). A powertrain of an electrified vehicle is typically equipped with a battery pack having battery cells that store electric power for powering the electric machines.

The battery pack can include one or more arrays of battery cells contained within an enclosure. Securing the arrays can be required. The battery pack can further includes a thermal exchange plate used to cool the arrays, heat the arrays, or both.

SUMMARY

An assembly according to an exemplary aspect of the present disclosure includes, among other things, a conforming bracket that secures a battery array within a battery pack. The conforming bracket includes platforms configured to flex as the conforming bracket is secured. The flexing facilitates aligning an area of the conforming bracket with a thermal exchange plate.

A further non-limiting embodiment of the foregoing assembly includes a rail member securing battery cell frames relative to the thermal exchange plate. The rail member is secured to the conforming bracket at rail attachment locations distributed axially along a longitudinal axis of the conforming bracket. Each of the rail attachment locations is positioned within one of the platforms.

In a further non-limiting embodiment of any of the foregoing assemblies, the rail member is separate and distinct from each of the battery cells frames.

In a further non-limiting embodiment of any of the foregoing assemblies, the rail attachment locations each comprise a platform aperture within one of the platforms. The platform aperture is configured to receive a mechanical fastener that is additionally received within a rail aperture of the rail member. The mechanical fastener secures the rail member to the platform of the conforming bracket.

In a further non-limiting embodiment of any of the foregoing assemblies, the thermal exchange plate is clamped between the rail member and the conforming bracket.

In a further non-limiting embodiment of any of the foregoing assemblies, the thermal exchange plate includes a first plate, a second plate, and a coolant channel established between the first and second plate. A portion of both the first and second plate are clamped between the rail member and the conforming bracket.

A further non-limiting embodiment of any of the foregoing assemblies includes pockets of the conforming bracket. The pockets are axially aligned with the platforms along a longitudinal axis of the bracket. The pockets are each secured directly to a battery pack enclosure at a pocket attachment location.

In a further non-limiting embodiment of any of the foregoing assemblies, the pockets each includes a floor and a sidewall extending from the floor to the platform.

In a further non-limiting embodiment of any of the foregoing assemblies, the floors of the pockets are welded to the area of the battery pack enclosure to secure the rail member directly to the battery pack enclosure.

A further non-limiting embodiment of any of the foregoing assemblies includes a flange of the conforming bracket that is radially spaced a distance from the platforms relative to a longitudinal axis of the conforming bracket. The flange is secured directly to the battery pack enclosure at a flange attachment locations axially distributed along the conforming bracket.

In a further non-limiting embodiment of any of the foregoing assemblies, each of the flange attachment locations is axially aligned with one of the platforms.

A further non-limiting embodiment of any of the foregoing assemblies includes a rail member securing a battery cell frames relative to the thermal exchange plate. The rail member is secured to the conforming bracket at rail attachment locations distributed axially along the conforming bracket. Each of the rail attachment locations is positioned within one of the platforms. The flange attachment locations are each axially misaligned with each of the rail attachment locations such that the flange attachment locations are not axially overlapping the rail attachment locations.

In a further non-limiting embodiment of any of the foregoing assemblies, the battery array is a battery array of an electrified vehicle.

A method of securing portions of a battery pack according to an exemplary aspect of the present disclosure includes, among other things, flexing a conforming bracket to reduce a gap between the battery array and a thermal exchange plate. The flexing occurs when securing a battery array within a battery pack.

A further non-limiting embodiment of the foregoing method includes supporting platforms of a conforming bracket with pockets of the conforming bracket. The pockets are secured directly to a battery pack enclosure. The platforms are spaced a distance from the battery pack enclosure.

In a further non-limiting embodiment of any of the foregoing methods, at least one of the platforms is disposed axially between axially adjacent pockets relative to a longitudinal axis of the conforming bracket.

A further non-limiting embodiment of any of the foregoing methods includes securing a rail member to the platforms to secure the battery array against the thermal exchange plate.

A further non-limiting embodiment of any of the foregoing methods includes, when securing the battery array to the battery pack enclosure, clamping a portion of the thermal exchange plate between the rail member and the conforming bracket.

A further non-limiting embodiment of any of the foregoing methods includes securing the rail member to the platforms using mechanical fasteners, and securing the battery pack enclosure to the pockets using welds.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to securing a battery array within a battery pack. In particular, the disclosure relates to a retention assembly and method utilizing a conforming bracket that secures the battery array of the battery pack to, for example, an enclosure of the battery pack.

The conforming bracket conforms to variations in the battery pack, which can, in some examples, reduce or eliminate a gap between components of the battery pack. An example of such a gap could include a gap between a thermal exchange plate and fins or battery cells of the battery array.

Figure 1:
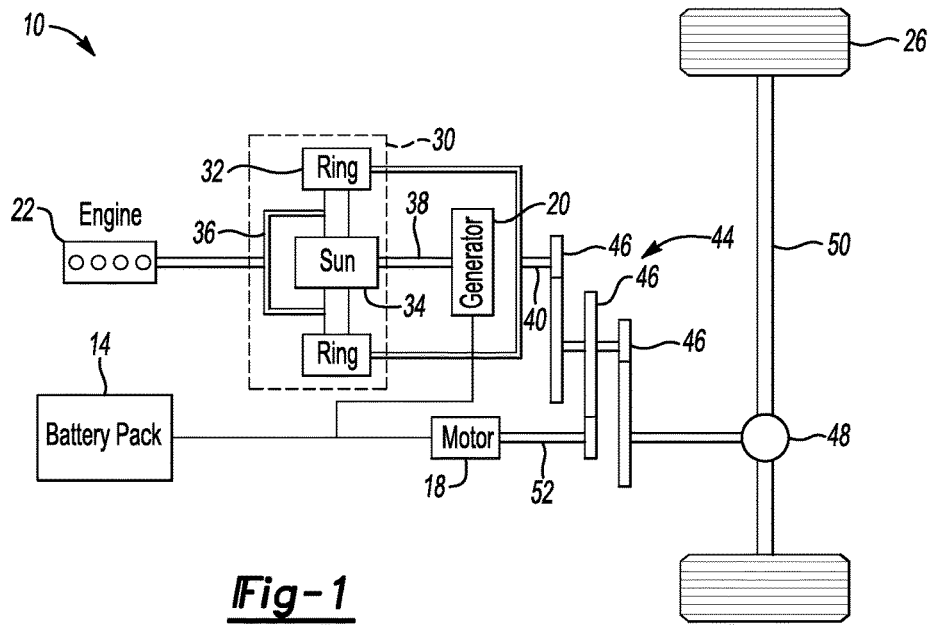
FIG. 1 illustrates a schematic view of a powertrain of an electrified vehicle.

FIG. 1 schematically illustrates a powertrain 10 for an electrified vehicle, which is a hybrid electric vehicle (HEV) in this example. Although depicted as an HEV, it should be understood that the concepts described herein are not limited to HEVs and could extend to other types of electrified vehicle, including, but not limited to, plug-in hybrid electric vehicles (PHEVs), battery electric vehicles (BEVs), fuel cell vehicles, etc.

The powertrain 10 includes a battery pack 14, a motor 18, a generator 20, and an internal combustion engine 22. The motor 18 and generator 20 are types of electric machines. The motor 18 and generator 20 may be separate or may have the form of a combined motor-generator.

In this embodiment, the powertrain 10 is a power-split powertrain system that employs a first drive system and a second drive system. The first and second drive systems generate torque to drive one or more sets of vehicle drive wheels 26 of the electrified vehicle. The first drive system includes a combination of the engine 22 and the generator 20. The second drive system includes at least the motor 18, the generator 20, and the battery pack 14. The motor 18 and the generator 20 are portions of an electric drive system of the powertrain 10.

The engine 22, which is an internal combustion engine in this example, and the generator 20 may be connected through a power transfer unit 30, such as a planetary gear set. Of course, other types of power transfer units, including other gear sets and transmissions, could be used to connect the engine 22 to the generator 20. In one non-limiting embodiment, the power transfer unit 30 is a planetary gear set that includes a ring gear 32, a sun gear 34, and a carrier assembly 36.

The generator 20 can be driven by engine 22 through the power transfer unit 30 to convert kinetic energy to electrical energy. The generator 20 can alternatively function as a motor to convert electrical energy into kinetic energy, thereby outputting torque to a shaft 38 connected to the power transfer unit 30. Because the generator 20 is operatively connected to the engine 22, the speed of the engine 22 can be controlled by the generator 20.

The ring gear 32 of the power transfer unit 30 can be connected to a shaft 40, which is connected to vehicle drive wheels 26 through a second power transfer unit 44. The second power transfer unit 44 may include a gear set having a plurality of gears 46. Other power transfer units may also be suitable.

The gears 46 transfer torque from the engine 22 to a differential 48 to ultimately provide traction to the vehicle drive wheels 26. The differential 48 may include a plurality of gears that enable the transfer of torque to the vehicle drive wheels 26. In this example, the second power transfer unit 44 is mechanically coupled to an axle 50 through the differential 48 to distribute torque to the vehicle drive wheels 26.

The motor 18 can also be employed to drive the vehicle drive wheels 26 by outputting torque to a shaft 52 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery pack 14.

Figure 2:
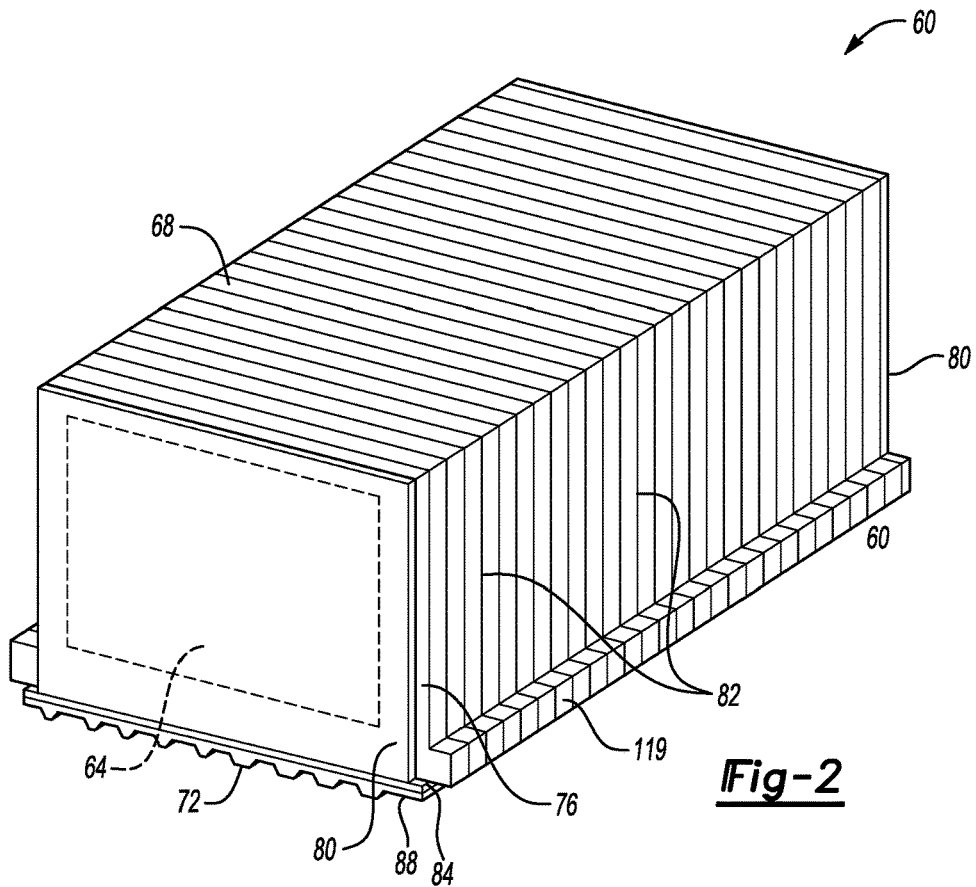
FIG. 2 illustrates a partially schematic and perspective view of a battery array of a battery pack within powertrain of FIG. 1.

Referring now to FIG. 2 with continuing reference to FIG. 1, the example battery pack 14 provides a relatively high-voltage battery that stores generated electrical power and outputs electrical power to operate the motor 18, the generator 20, or both. The battery pack 14 includes at least one battery array 60 having a plurality of individual battery cells 64 each held within a support structure 68 and disposed upon a thermal exchange plate 72. The battery array 60 may include, for example, from thirty to fifty individual battery cells 64.

The support structure 68 includes, among other things, a battery cell frame 76 about a perimeter of each of the battery cells 64. Each frame 76 supports two individual battery cells 64 in this example. The frames 76 are a polymer material, but other materials are contemplated.

The frames 76 and the battery cells 64 are held between opposing end walls 80. The frames 76 and the battery cells 64 are disposed adjacent to the thermal exchange plate 72. Fins 82 are positioned between the battery cells 64. The fins 82 extend from between the battery cells 64 to a position near the thermal exchange plate 72. The fins 82 can conduct thermal energy between the thermal exchange plate 72 and the battery cells 64. The fins 82 may directly contact the thermal exchange plate 72. The fins 82 can be aluminum, for example.

A thermal interface material can be positioned where the fins 82 interface with the thermal exchange plate 72. The thermal interface material facilitates thermal energy conduction between the fins 82 and the thermal exchange plate.

In this example, the thermal exchange plate 72 includes a first plate 84, a second plate 88, and a plurality of coolant channels 92 established between the first plate 84 and the second plate 88. A coolant can be circulated through the coolant channels 92 and then moved from the battery array 60 to carry thermal energy from the battery array 60. The thermal exchange plate 72 can be, for example, a metal or metal-alloy.

Figure 3:
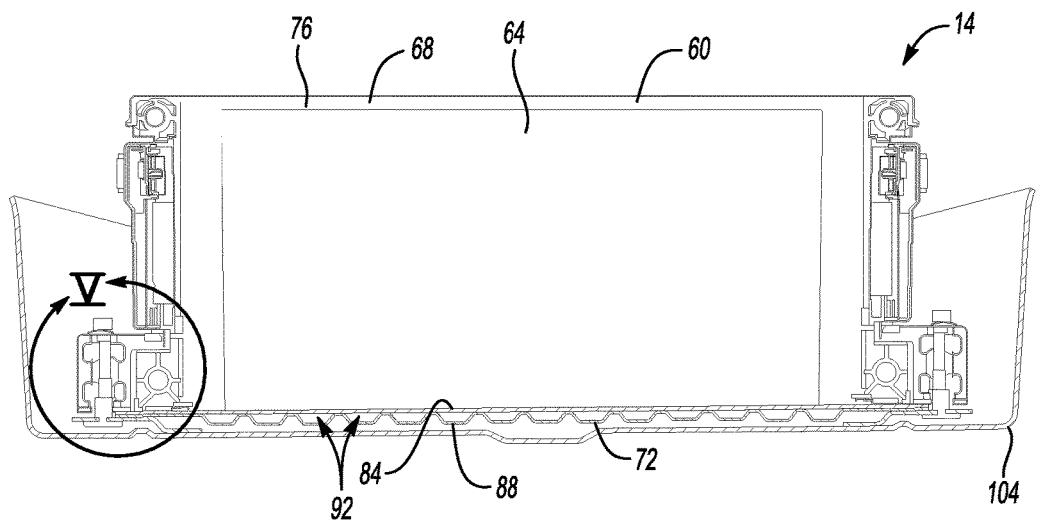
FIG. 3 illustrates a section view of the battery pack from the powertrain of FIG. 1.
Figure 4:
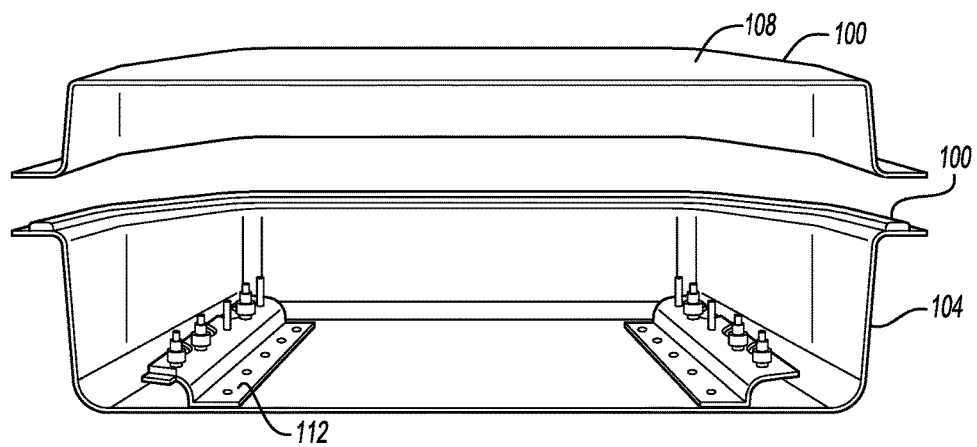
FIG. 4 illustrates the section view of FIG. 3 without the battery array.
Figure 5:
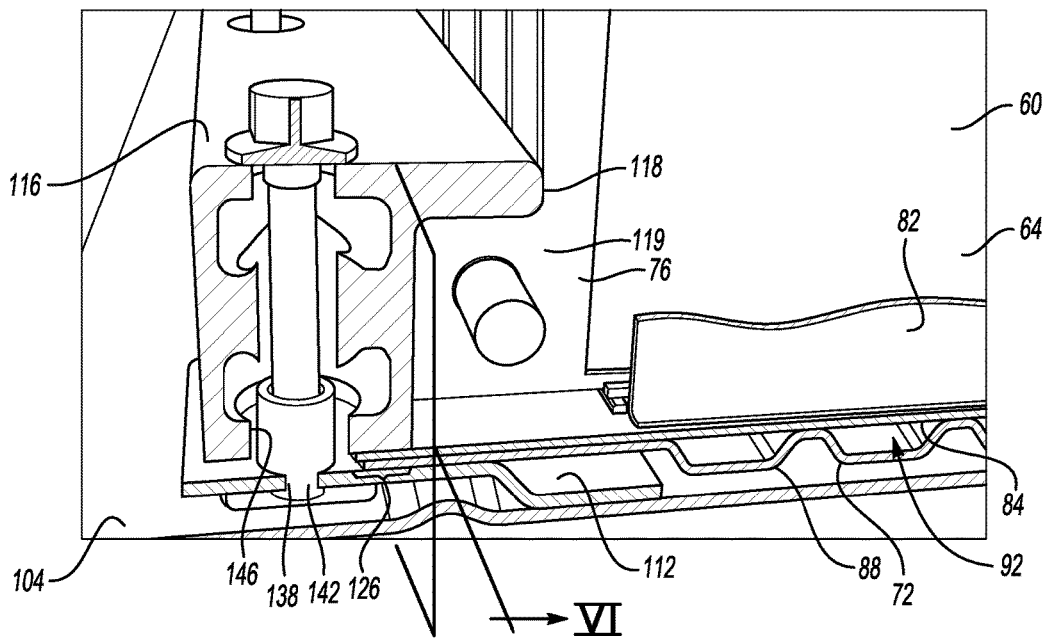
FIG. 5 illustrates a close-up perspective view of Area-V in FIG. 3.

Referring now to FIGS. 3 to 5 with continuing reference to FIGS. 1 and 2, the battery array 60 is housed within an enclosure 100 having, in this example, a tray 104 and a lid 108. The enclosure 100 can be a metal or metal-alloy. Other examples could utilize other materials, such as polymer-based materials.

The battery array 60 is secured to the enclosure 100 via a pair of conforming brackets 112. One of the conforming brackets 112 is located along each lateral side of the battery array 60. In this example, the conforming brackets 112 are fastened to the tray 104, and another portion of the conforming brackets 112 is secured to a rail member 116. The conforming brackets 112 can be a metal or metal-alloy. Other examples could utilize other materials, such as polymer-based materials.

The rail member 116 includes an overhang 118, or lip, that, when the rail member 116 is fastened to the conforming bracket 112, clamps a laterally extending foot 119 of the frame 76 to hold the battery array 60.

When the battery array 60 is secured within the enclosure 100 by the conforming brackets 112, outer peripheral edge portions 126 of the first plate 84 and the second plate 88 are clamped between the rail member 116 and the conforming brackets 112.

When the battery array 60 is secured within the enclosure 100 by the conforming brackets 112, a portion of the fins 82 extends to a position adjacent the thermal exchange plate 72. A thermal interface material 114 is positioned between the portion of the fins 82 and the thermal exchange plate 72 to facilitate thermal conductivity between the fins 82 and the thermal exchange plate 72

In the past, dimensional variations in a thermal exchange plate could result in gaps between the thermal exchange plate and other portions of a battery array. For example, a substantially planar surface of a rigid structure used to secure the battery array would interface with a wavy surface of the relatively soft thermal exchange plate. The substantially planar surface would initially contact the peaks of the relative wavy surface. As the rigid structure and the relatively soft thermal exchange plate are forced against one another during securing, the rigid structure forces the relatively soft thermal exchange plate to deform.

The deformation of the relatively soft thermal exchange plate can result in increased gaps or spaces between the thermal exchange plate and other portions of the battery array, such as gaps to the fins utilized for thermal conduction. These spaces, or gaps, could, among other things, result in less efficient thermal transfer between the fins (or battery cells) and the thermal exchange plate. The spaces, or gaps, could necessitate using additionally thermal interface material to fill the spaces or gaps.

The exemplary conforming bracket 112 incorporates features permitting the conforming bracket 112 to flex and conform to irregularities, such as waves, within the thermal exchange plate 72 as the conforming bracket 112 is secured. Conforming to the irregularities in the thermal exchange plate 72 can reduce deformation of the thermal exchange plate 72 during the securing. Reducing the deformation of the thermal exchange plate 72 can, among other things, facilitate good thermal contact between the thermal exchange plate 72 and other areas of the battery array 60, which can improve thermal conductivity.

Figure 6:
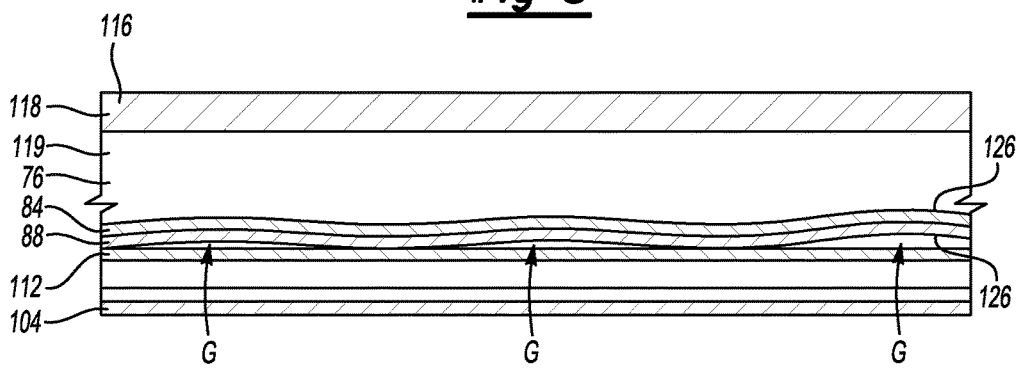
FIG. 6 illustrates a section view of a selected portion of the battery pack of FIG. 3 taken along line VI-VI in FIG. 7 prior to securing a conforming bracket within the battery pack.

Referring to FIG. 6, a portion of one of the conforming brackets 112 is shown prior to securing the rail member 116 and clamping the peripheral edge portions 126 of the first plate 84 and the second plate 88 of the thermal exchange plate 72. As shown, gaps G exist between the conforming bracket 112 and the second plate 88. The gaps G are exaggerated in this example for drawing clarity.

Figure 7:
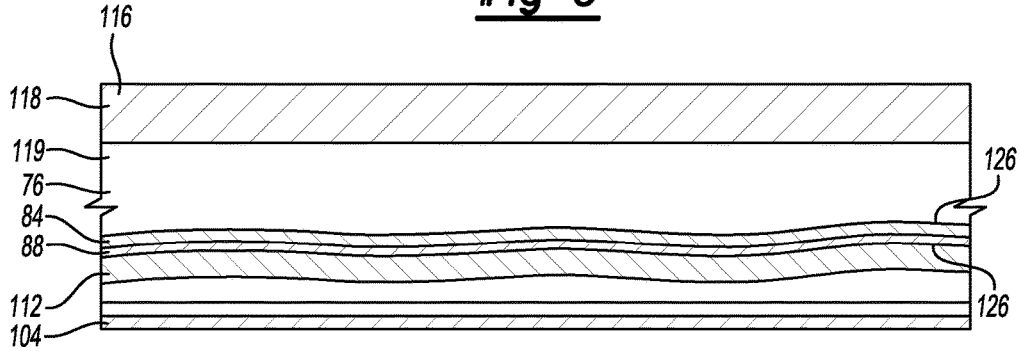
FIG. 7 illustrates the section view of FIG. 6 after securing the conforming bracket within the battery pack

Referring to FIG. 7, the same conforming bracket 112 is shown after securing the rail member 116 to the first plate 84 and the second plate 88 of the thermal exchange plate. As shown, the conforming bracket 112 flexes to conform to the irregularities in the first plate 84 and the second plate 88.

Figure 8:
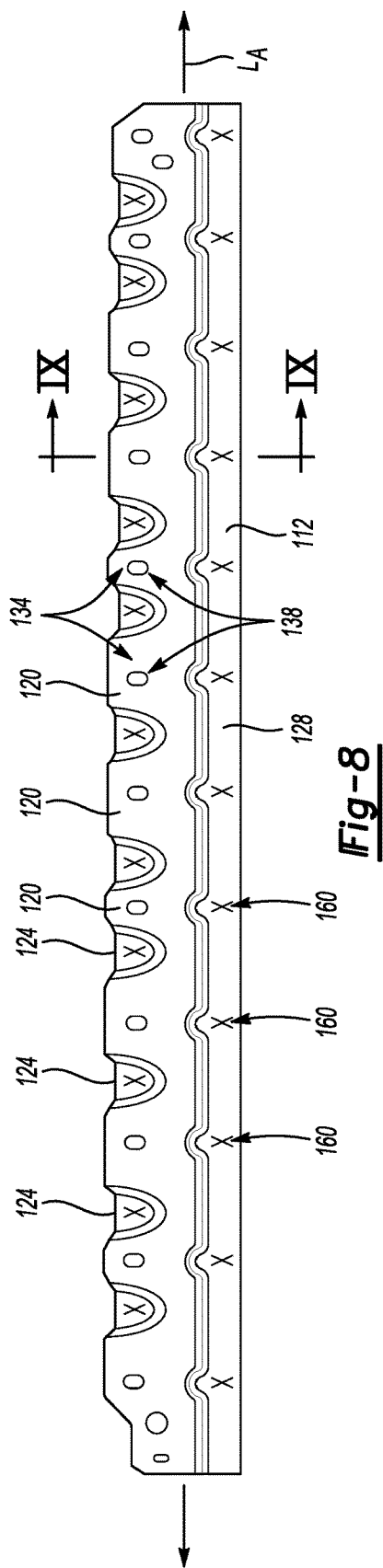
FIG. 8 illustrates a top view of one of the conforming brackets from the battery pack of FIG. 2.
Figure 9:
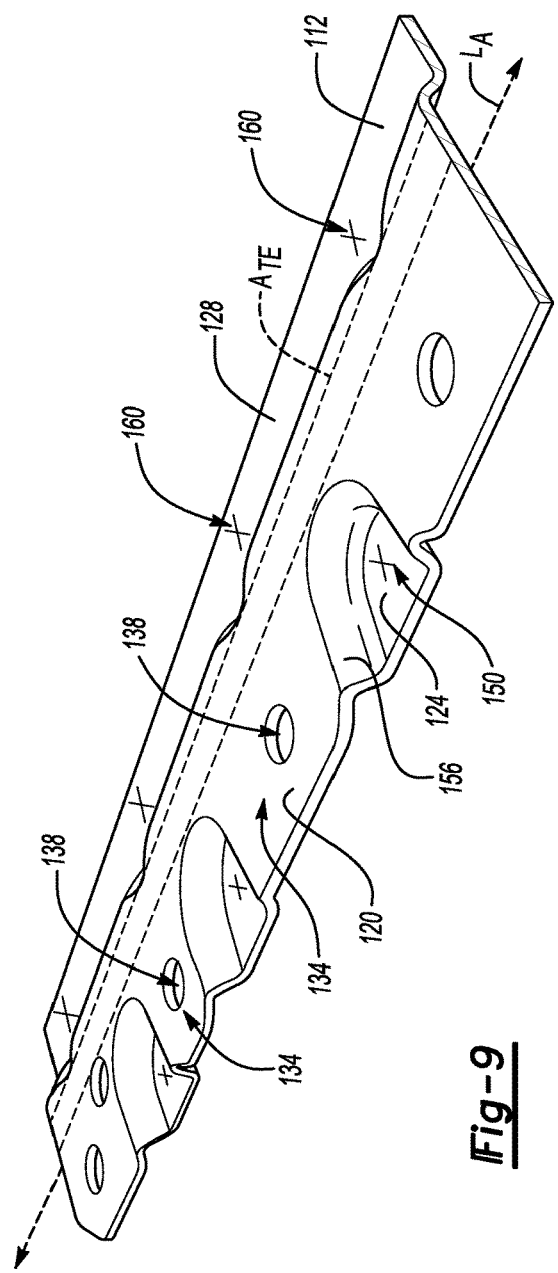
FIG. 9 illustrates a perspective, section view of the conforming bracket taken along line IX-IX in FIG. 8.

Some of the features of the conforming bracket 112 facilitating the conforming to the first plate 84 and the second plate 88 will now be described with reference to FIGS. 5, 8, and 9. As shown, the conforming bracket 112 extends along a longitudinal axis $L_A$, which is aligned with a longitudinal access of the battery array 60. The conforming bracket 112 includes a plurality of platforms 120, a plurality of pockets 124, and an attachment flange 128.

The platforms 120 provide a plurality of rail attachment locations 134. In this example, the rail attachment locations 134 comprise apertures 138 within the platforms 120. When the battery array 60 is secured, a mechanical fastener 142 extends through the platform apertures 138, and additionally through a rail aperture 146 to secure the rail member 116 to the conforming bracket 112.

In this example, the mechanical fastener 142 is a threaded fastener that pulls the rail member 116 and the platforms 120 relatively close to one another as the mechanical fastener 142 is torqued into a fully fastened position. Although described as the mechanical fastener 142, other attachment techniques could be utilized, including welds.

The peripheral edge portions 126 of the first plate 84 and the second plate 88 of the thermal exchange plate 72 as shown as extending laterally and terminating prior to reaching the mechanical fastener 142 and the pockets 124. In other examples, some of the peripheral edge portions 126 could extend laterally further to be positioned axially, relative to the longitudinal axis $L_A$, between axially adjacent mechanical fasteners 142, axially adjacent pockets 124, or both.

The pockets 124 each include a floor 150 and a sidewall 156. The sidewall 156 extends from the floor 150 to the platform 120. The pockets 124 are frustoconical in this example.

With reference to the longitudinal axis $L_A$, the platforms 120 and the pockets 124 are axially aligned. Further, the platforms 120 alternate with the pockets 124 moving axially along the conforming bracket 112. That is, at least one of the pockets 124 is axially between axially adjacent platforms 120 along the axial length of the conforming bracket 112.

The pockets 124 are secured directly to the tray 104 via, for example, welds in the floors 150 of the pockets 124. The location of the weld in each of the pockets 124 is represented by an "X" in FIGS. 8 and 9.

In this example, the conforming bracket 112 is secured to the tray 104 prior to installing the battery array 60. The securing of the pockets 124 helps to secure the conforming bracket 112 to the tray 104 as the mechanical fasteners 142 are torqued down to secure the rail member 116 and clamp the first plate 84 and the second plate 88.

The platforms 120 are spaced a distance from the tray 104. In some examples the platforms 120 are spaced less than seven millimeters from the tray 104.

As the mechanical fasteners 142 are torqued down, the sidewalls 156 and the platforms 120 can flex to permit an area $A_{TE}$ of the conforming bracket 112 that interfaces with the thermal exchange plate 72 to flex and conform to irregularities within the thermal exchange plate 72, which can reduce or eliminate gaps G. Reducing or eliminating the gaps can, among other things, desirably reduce deformation and stresses induced in the thermal exchange plate 72 when securing the thermal exchange plate 72 to the conforming bracket 112. A thickness of the conforming bracket 112 can be varied as needed to provide an appropriate amount of flexing or spring back.

Figure 9A:
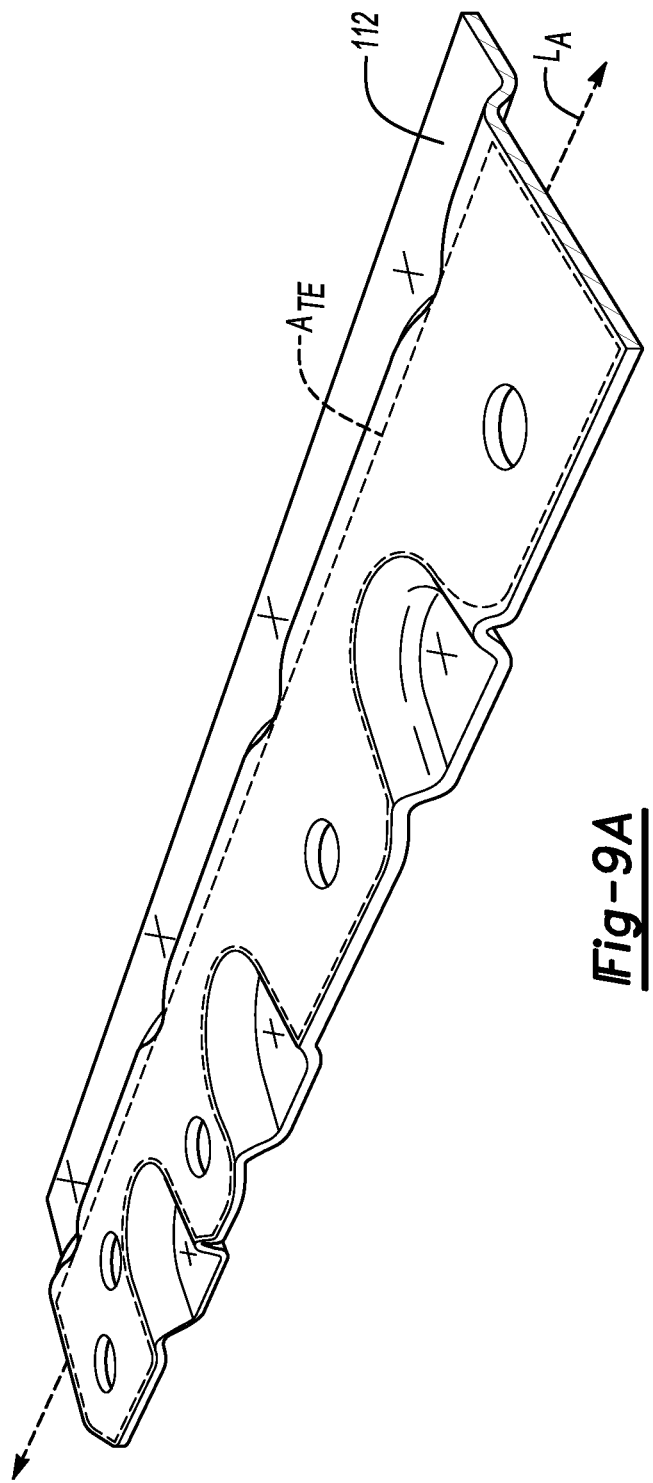
FIG. 9A illustrates the section view of FIG. 9 with the conforming bracket having a different area interfacing with a thermal exchange plate.

As shown in FIG. 9A, in examples where the peripheral edge portions 126 of the first plate 84 and the second plate 88 extend laterally further to be positioned axially between axially adjacent mechanical fasteners 142, axially adjacent pockets 124, or both, an area $A_{TE}'$ of the conforming bracket 112 that interfaces with the thermal exchange plate extends laterally to these areas.

Referring again to FIG. 9, the conforming bracket 112 is additionally secured to the tray 104 at flange attachment locations 160 on the attachment flange 128. In this example, the flange attachment locations 160 are each represented by an "X" on the attachment flange 128. Spot welds, for example, could be used to secure the attachment flange 128 to the tray 104 at the flange attachment locations 160.

Notably, the flange is spaced radially relative to the longitudinal axis $L_A$ from both the platforms 120 and the pockets 124. Also, the flange attachment locations 160 are axially aligned with the rail attachment locations 134, which has been found to desirably facilitate flexing of the area $A_{TE}$ to conform to the thermal exchange plate 72.

Features of some of the disclosed examples include a retention assembly that can secure a battery array within a battery pack without substantially bending or flexing a thermal exchange plate. Essentially, the retention assembly can conform to the thermal exchange plate rather than the thermal exchange plate conforming to the retention assembly. This can, among other things, help to reduce or eliminate gaps between the thermal exchange plate and other components thereby improving thermal conductivity. Also, the required thermal interface material can be reduced.

In some examples, the retention assembly is a bracket having a relatively small width (about fifty-five millimeters) and height (about seven millimeters) to facilitate incorporating the conforming bracket in a relatively tight packaging envelope.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An assembly, comprising:
   a conforming bracket that secures a battery array within a battery pack, the conforming bracket including a plurality of platforms configured to flex as the conforming bracket is secured to align an area of the conforming bracket with a thermal exchange plate; and
   a rail member securing a plurality of battery cell frames relative to the thermal exchange plate, the rail member secured to the conforming bracket at a plurality of rail attachment locations distributed axially along a longitudinal axis of the conforming bracket, each of the plurality of rail attachment locations positioned within one of the plurality of platforms.

2. The assembly of claim 1, wherein the rail member is separate and distinct from each of the plurality of battery cells frames.

3. The assembly of claim 1, wherein the plurality of rail attachment locations each comprise an platform aperture within one of the plurality of platforms, the platform aperture configured to receive a mechanical fastener that is additionally received within an rail aperture of the rail member, the mechanical fastener securing the rail member to the platform of the conforming bracket.

4. The assembly of claim 1, wherein the thermal exchange plate is clamped between the rail member and the conforming bracket.

5. The assembly of claim 4, wherein the thermal exchange plate comprises a first plate, a second plate, and a coolant channel established between the first and second plate, wherein a portion of both the first and second plate are clamped between the rail member and the conforming bracket.

6. The assembly of claim 1, wherein the battery array is a battery array of an electrified vehicle.

7. An assembly, comprising:
   a conforming bracket that secures a battery array within a battery pack, the conforming bracket including a plurality of platforms configured to flex as the conforming bracket is secured to align an area of the conforming bracket with a thermal exchange plate;
   a plurality of pockets in the conforming bracket, the plurality of pockets axially aligned with the plurality of platforms along a longitudinal axis of the bracket, the plurality of pockets each secured directly to a battery pack enclosure at a pocket attachment location; and
   a flange of the conforming bracket that is radially spaced a distance from the plurality of platforms relative to a longitudinal axis of the conforming bracket, the flange secured directly to the battery pack enclosure at a plurality of flange attachment locations axially distributed along the conforming bracket.

8. The assembly of claim 7, wherein the plurality of pockets each comprise a floor and a sidewall extending from the floor to the platform.

9. The assembly of claim 8, wherein the floors of the plurality of pockets are welded to the battery pack enclosure to secure the conforming bracket directly to the battery pack enclosure.

10. The assembly of claim 7, wherein each of the plurality of flange attachment locations is axially aligned with one of the plurality of platforms.

11. The assembly of claim 7, further comprising a rail member securing a plurality of battery cell frames relative to the thermal exchange plate, the rail member secured to the conforming bracket at a plurality of rail attachment locations distributed axially along the conforming bracket, each of the plurality of rail attachment locations positioned within one of the plurality of platforms, wherein the flange attachment locations are each axially misaligned with each of the plurality of rail attachment locations such that the flange attachment locations are not axially overlapping the rail attachment locations.

12. A method of securing portions of a battery pack, comprising:
   when securing a battery array within a battery pack, flexing a conforming bracket to reduce a gap between the battery array and a thermal exchange plate;
   supporting a plurality of platforms of a conforming bracket with a plurality of pockets of the conforming bracket, the plurality of pockets secured directly to a battery pack enclosure, the plurality of platforms spaced a distance from the battery pack enclosure; and
   securing a rail member to the plurality of platforms to secure the battery array against the thermal exchange plate.

13. The method of claim 12, wherein at least one of the platforms in the plurality of platforms is disposed axially between axially adjacent pockets within the plurality of pockets relative to a longitudinal axis of the conforming bracket.

14. The method of claim 12, further comprising, when securing the battery array to the battery pack enclosure, clamping a portion of the thermal exchange plate between the rail member and the conforming bracket.

15. The method of claim 12, further comprising securing the rail member to the plurality of platforms using a plurality of mechanical fasteners, and securing the battery pack enclosure to the plurality of pockets using a plurality of welds.

* * * * *